April 7, 1925.
R. DORWARD
EXCAVATOR
Filed Nov. 24, 1923
1,533,061
2 Sheets-Sheet 1
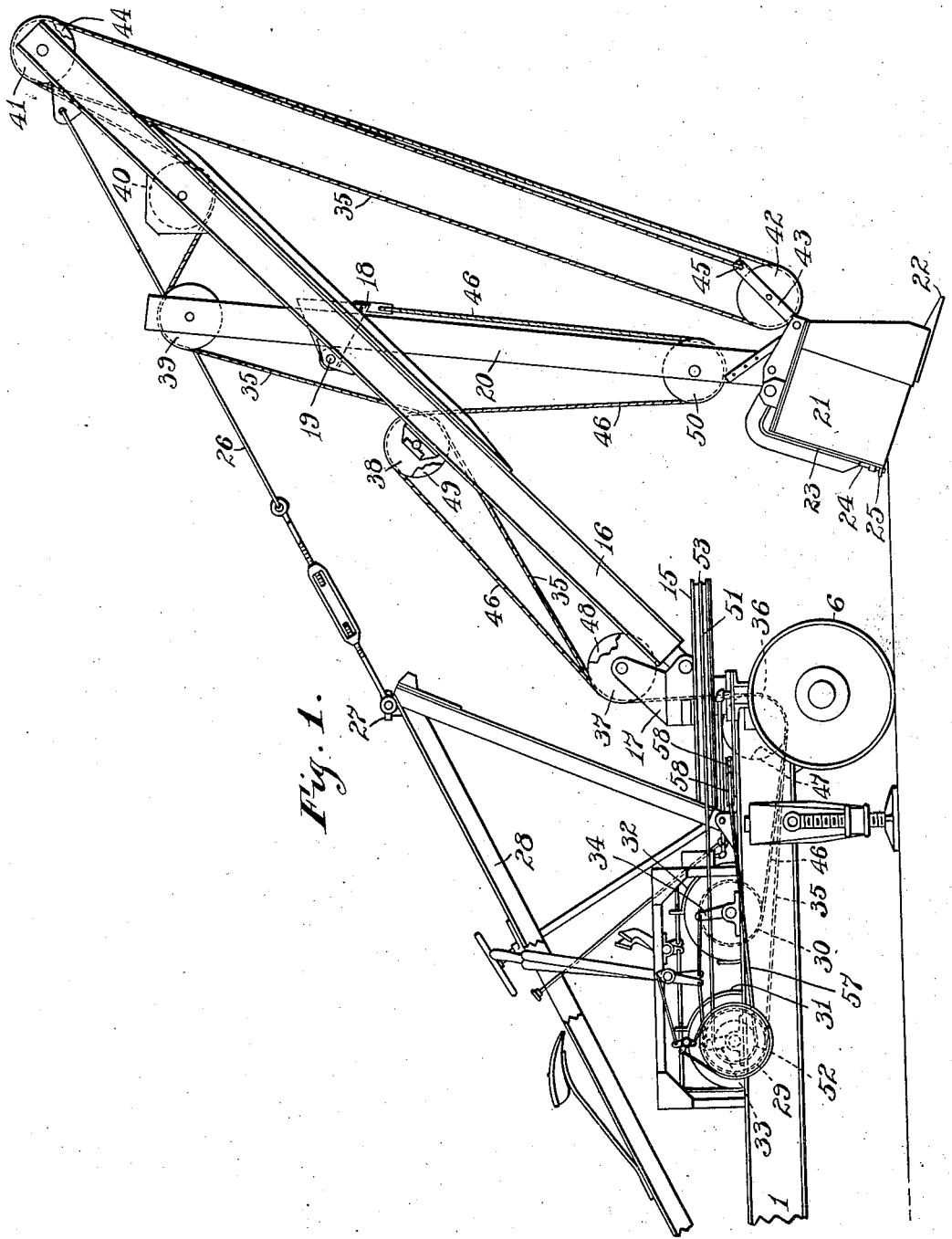
INVENTOR
Raymond Dorward;
BY
Arthur M. Hood
ATTORNEY April 7, 1925.
R. DORWARD
EXCAVATOR
Filed Nov. 24, 1923    2 Sheets-Sheet 2
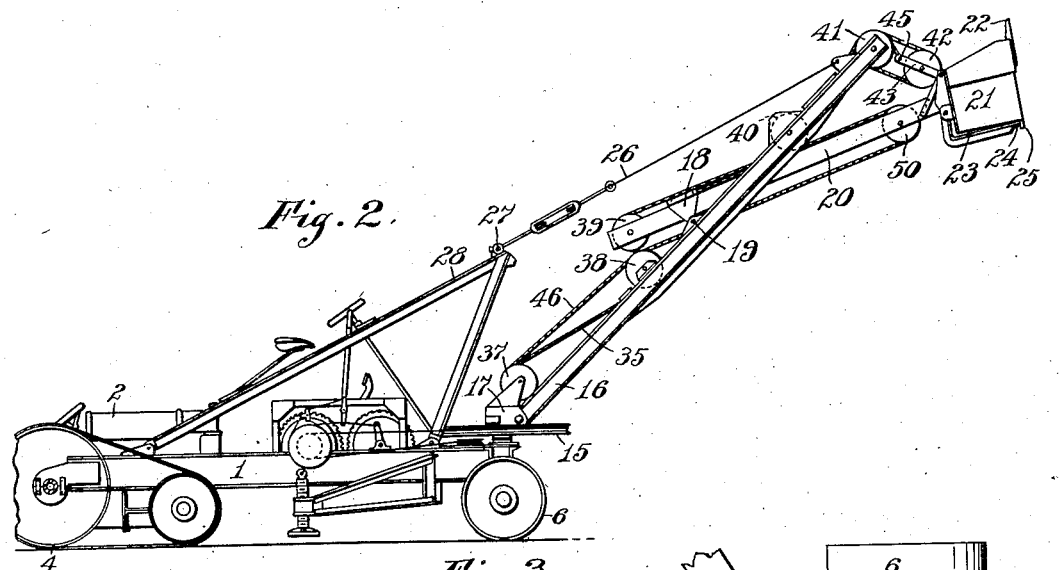
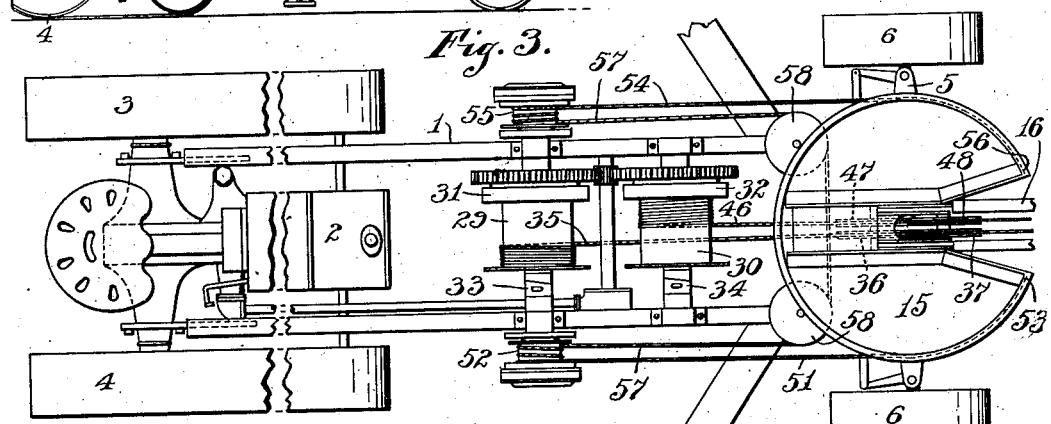
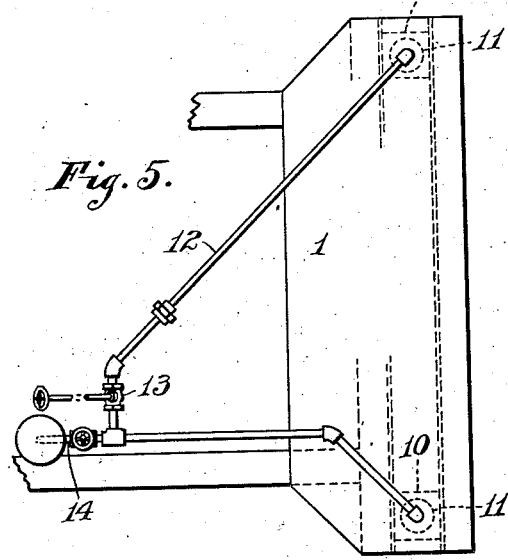
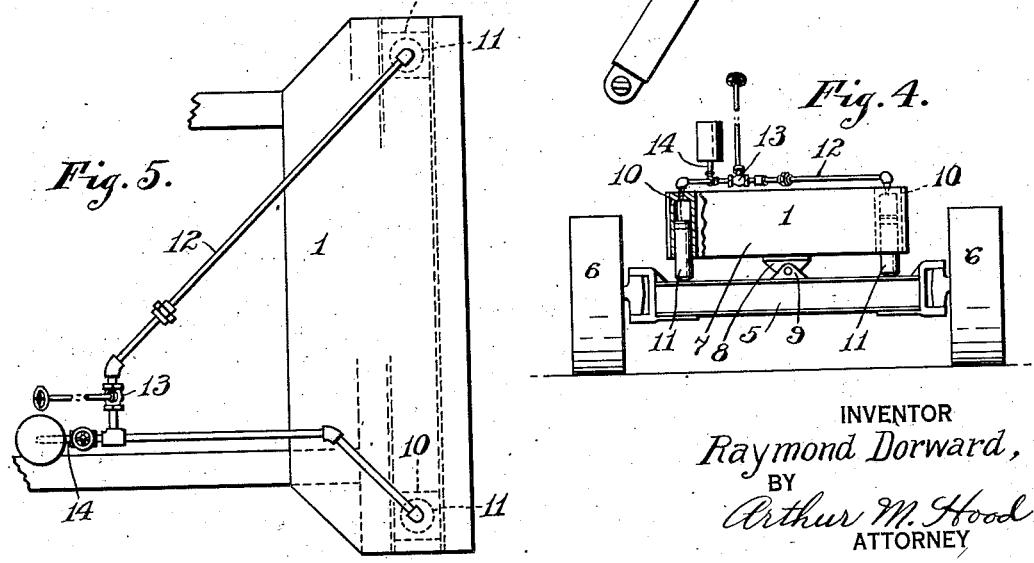
INVENTOR
Raymond Dorward,
BY
Arthur M. Hood.
ATTORNEY Patented Apr. 7, 1925.

1,533,061

UNITED STATES PATENT OFFICE.

RAYMOND DORWARD, OF JASONVILLE, INDIANA, ASSIGNOR TO INSLEY MANUFACTURING COMPANY, OF INDIANAPOLIS, INDIANA, A CORPORATION OF INDIANA.

EXCAVATOR.

Application filed November 24, 1923. Serial No. 676,689.

*To all whom it may concern:*

Be it known that I, RAYMOND DORWARD, a citizen of the United States, residing at Jasonville, in the county of Greene and State of Indiana, have invented a new and useful Excavator, of which the following is a specification.

My invention relates to improvements in power shovels and has for one of its objects that of providing means for operating the shovel which dispenses with the usual hydraulic or rack and gear projecting means for the shovel handle.

Another object of my invention is to provide a power operated shovel in which the shovel is wholly manipulated by the use of cables, thereby dispensing with a large number of operating parts.

Another object of my invention is to provide a power operating shovel whereby the thrust on the shovel is automatically increased in proportion to the resistance offered the shovel in its digging operation.

Other objects and advantages will be more fully brought out in the accompanying specification and claims.

For the purpose of disclosing my invention, I have illustrated certain embodiments in the accompanying drawings, in which, Fig. 1 is a side elevation of a shovel embodying my invention;

Fig. 2 is a side elevation showing the shovel in a different position;

Fig. 3 is a plan of the tractor portion of the structure illustrated in Figs. 1 and 2;

Fig. 4 is an end elevation of the tractor showing means for locking the frame against tilting, and Fig. 5 is a diagrammatic view of the hydraulic connections for the cylinders shown in Fig. 4.

In the structure illustrated, the parts are all mounted upon a frame 1, at the rear end of which is arranged a power plant 2 supported from the tractor wheels 3 and 4. The front end of the frame 1 is supported upon the front axle 5 having the steering wheels 6 mounted thereon. The front end of the frame is provided with a cross member 7, the bottom of which, intermediate of its ends, has a pivot block 8 pivotally secured on a block 9 on the axle 5 whereby a rocking play is permitted between the frame and the axle so that in passing over rough ground the axle may move without unnecessarily rocking the frame. At each end of the cross beam 7 there is provided an open bottom hydraulic cylinder 10 provided with a piston 11, the lower end of which is adapted to be projected into engagement with the top of the axle 5. The two cylinders are connected by a pipe 12 provided, intermediate of its ends, with a valve 13 and having a valved filling branch 14. This pipe, as well as the cylinders 10, is adapted to be filled with oil and the pipe provides a passage for the oil from one cylinder to the other. During the transit period the valve 13 is opened so that each of the cylinders 10 is in communication with the other, whereby as the axle 5 rocks, due to the inequalities of the ground, the oil may pass from one cylinder to the other. When the apparatus is brought to rest, the valve 13 is closed so that the oil cannot escape from either cylinder and as a result both pistons are hydraulically locked in the position which they have assumed and relative movement between the frame and the axle is prevented.

Mounted at the forward end of the frame 1 is a turntable 15 which supports the lower end of a boom 16, this lower end being pivotally mounted on a block 17 arranged on the vertical axis of the turntable. The boom preferably comprises a pair of spaced apart channel members suitably braced and secured at their ends, and intermediate of the ends of the boom is mounted a guide block, or yoke 18, pivoted on a horizontal axis on a shaft 19 on the boom. This guide block receives a bucket handle 20 which is preferably formed of a pair of channel members suitably held spaced apart by wooden spacers placed between the same. The forward end of the handle carries a bucket 21 having a digging edge 22 and a gravity opened bottom 23 held in place by a gravity operated latch 24 operating in an eye 25 on the front of the bucket. The forward end of the boom 16 is suitably supported by adjustable guy rods 26 secured at their rear ends to a pivot pin 27 pivoted in vertical axial alignment with the axis of the turntable 15 in a socket mounted at the forward end of the frame 28.

Winding drums 29 and 30 respectively provided with independently controlled brakes 31 and 32 are mounted upon the frame 1 and adapted to be driven from the power plant 2. Suitable independently operating clutches 33 and 34 are provided for respectively connecting the winding drums 29 and 30 with the power mechanism. A cable 35 on the drum 29 passes beneath a sheave 36 and up through the turntable 15 in alignment with the vertical axis thereof and over a sheave 37 mounted on the block 17. A sheave 38 is mounted on the boom 16 to the rear of the pivot point 19 of the yoke 18 and the cable 35 passes beneath this sheave and hence over a sheave 39 mounted at the rear end of the handle 20. The cable then passes forward and beneath a sheave 40 mounted on the boom 16 beyond the pivot point of the yoke 18 and thence over a sheave 41 at the forward end of the boom. From here the cable passes downwardly over a sheave 42 in a suitable yoke or block 43 connected to the bucket 21 and thence upwardly and over a second sheave 44 on the end of the boom and downwardly to be connected at 45 to the block 43.

The second cable 46 passes from the drum 30 beneath a sheave 47 parallel with the sheave 36 and over a sheave 48 parallel with the sheave 37 and thence over a sheave 49 parallel with the sheave 38. It then passes forward and under a sheave 50 at the bucket end of the handle 20 and thence rearwardly to be connected to the yoke or guide 18.

A cable 51 wrapped on and secured to the drum 52 operates in the groove of the turntable 15 and at one end is connected at 53 to the turntable. A second cable 54, similarly wrapped on drum 55, is connected at 56 to the turntable. By connecting one of the drums with the driving power and disconnecting the other drum, the turntable may be swung on its pivot in either direction. To prevent the weight of the cable of the disconnected drum from unwinding the drum and thereby becoming slack, I provide a cable 57 passing over sheaves 58 and having its ends wrapped on and connected to the drums 52 and 55 so that, as one drum is power driven in one direction, the other drum will be rotated by the cable 57 in the reverse direction.

It will be noted that the cable 46 forms an adjustable thrust abutment to take the thrust of the cable 35 under certain conditions of manipulation. In one manner of operation, by slacking off on the cable 35 and taking up on the cable 46, the bucket may be lowered and at the same time drawn rearwardly toward the frame 1. After the bucket has been dropped into engagement with the material to be lifted, by slacking off on the cable 46 and taking up on the cable 35, the bucket will be projected into the material and at the same time pulled forwardly and upwardly, and it will be noted that during this operation the thrust on the bucket into the material increases with the pull on the bucket through the material so that the bucket will be held well into the material and will not have a tendency to slide over the top. With the cable 46 slacked off, the continued manipulation of cable 35 will raise the bucket and at the same time project it to the limit of its outermost movement. If it is desired to raise the bucket in a retracted position, it is obvious that by taking up on the cable 46, the bucket handle will be held in a retracted position, depending upon the amount of takeup of the cable 46, and the bucket raised to the desired elevation. Also it is obvious that, with the bucket raised in the position indicated in the drawing, Fig. 1, if it be desired to retract the bucket, by taking up on the cable 46 and slacking off on cable 35, using the brake on the drum 29 however, to prevent too great a slack in the cable 35, the bucket may be retracted to any position desired.

I claim as my invention:

1. In a device of the character described, the combination with a boom, of a dipper handle carrying a dipper and slidably and swingably mounted on said boom, an operating cable for raising and lowering said handle, said cable having a loop therein arranged to pass over a sheave at the rear end of said handle to produce a thrust in one direction on said handle and also engaging the handle at another point to swing the same, and a second operating cable having one end stationarily connected and having a loop therein arranged to pass over a sheave at the forward end of said handle to effect a thrust on said handle in an opposite direction to that of said first mentioned cable.

2. In a device of the character described, the combination with a boom, of a dipper handle carrying a dipper and slidably and swingably mounted on said boom, a pair of sheaves on said boom disposed on opposite sides of the pivotal point of the handle, a sheave at the rear end of said handle, and a raising and lowering cable for said handle passing beneath said sheaves on the boom and over the sheave on the handle to form a loop for exerting a thrust in one direction on said handle.

3. In a device of the character described, the combination with a boom, of a dipper handle carrying a dipper and swingably and slidably mounted on said boom, a raising and lowering cable for said handle, a sheave on said boom on one side of the pivotal point of the handle, a sheave at the forward end of said handle, and an operating cable passing over said sheaves and having its free end stationarily connected to form a loop for exerting a thrust in one direction on said handle.

4. In a device of the character described, the combination with a boom, of a dipper handle carrying a dipper and swingably and slidably mounted on said boom, a pair of sheaves disposed on opposite sides of the pivotal point of said handle and mounted on said boom, a sheave at the rear end of said handle, a raising and lowering cable for said handle passing beneath said sheaves on the boom and over said sheave on the handle to exert a thrust thereon in one direction, a sheave on said boom and a sheave on the forward end of said handle and a second cable passing over said sheaves and having its free end stationarily connected for exerting a thrust in the opposite direction on said handle.

5. In a power shovel the combination of a boom having a sheave adjacent the outer end thereof, a dipper and dipper handle mounted on said boom for swinging and lengthwise shifting movement, a hoisting drum, a hoisting cable extending therefrom over said sheave and associated with said handle to swing said handle, that portion of said cable between said drum and sheave being associated with the inner end of said handle to maintain an outward thrust thereon, and means opposing said thrust to effect and control lengthwise shifting of said handle.

6. In a power shovel the combination of a boom having a sheave adjacent the outer end thereof, a dipper and dipper handle mounted on said boom for swinging and lengthwise shifting movements, a hoisting drum, a hoisting cable extending therefrom over said sheave and associated with said handle to swing said handle, a sheave on said handle in engagement with that portion of said cable between said drum and first named sheave for maintaining an outward thrust upon said handle, and a second cable associated with said handle for opposing said thrust to effect and control lengthwise shifting of said handle.

7. A power shovel comprising a boom, a power drum, a dipper having a handle swingably and slidably mounted on the boom, an operating cable associated with the drum, boom and dipper and passing from the drum first to a thrusting association with the dipper and then to a swinging association with the dipper, the thrusting association being such as to exert a thrust bias outwardly only upon the dipper, and independently controllable means by which outward movement of the dipper may be resisted and inward movement be produced.

8. In a device of the character described, the combination with a boom, of a dipper handle carrying a dipper and slidably and swingably mounted on said boom, a pair of sheaves on said boom disposed on opposite sides of the pivotal point of the handle, a sheave at the rear end of said handle, and a raising and lowering cable for said handle passing beneath said sheaves on the boom and over the sheave on the handle to form a loop for exerting a thrust in one direction on said handle, and engaging the outer end of the handle to upwardly swing the same, and means for engaging the dipper handle to resist the outward thrust of the first-mentioned cable.

9. In a device of the character described, the combination with a boom, of a dipper, a connection between the boom and dipper permitting dipper swing and dipper reciprocation relative to its axis, cable drawing means, a cable passing from the drawing means over the boom to a dipper-swinging association with the dipper and, at a point between said association and the drawing means engaging the boom and dipper to thrust it outwardly, and independent means for thrusting the dipper inwardly and resisting the outward thrust of said cable.

10. In a device of the character described, the combination with a boom, of a dipper, a connection between the boom and dipper permitting dipper swing and dipper reciprocation relative to its axis, cable drawing means, a cable passing from the drawing means over the boom to a dipper-swinging association with the dipper and, at a point between said association and the drawing means engaging the dipper to thrust it outwardly, and independent means for thrusting the dipper inwardly and resisting the outward thrust of said cable.

11. A power shovel comprising in combination a boom, a dipper having a handle swingably and slidably mounted on said boom and an operating cable arranged to serve both to swing and thrust the handle passing from the power first to a thrusting association with the dipper and then to a swinging association with the dipper, and independent means for thrusting the dipper inwardly and resisting the outward thrust of the operating cable.

12. A power shovel comprising in combination a boom, a bucket having a handle swingably and slidably mounted on said boom, an operating cable arranged to serve both to swing and thrust the handle and pass from the power drum first to a thrusting association with the dipper and then to a swinging association with the dipper, the thrusting association being such as to exert a thrust bias outwardly only upon the handle, and independently controllable means by which outward movement of the handle may be resisted and inward movement of the handle produced.

In witness whereof, I RAYMOND DORWARD have hereunto set my hand at Indianapolis, Indiana, this 22nd day of November, A. D. one thousand nine hundred and twenty three.

RAYMOND DORWARD.